3,572,275
METHOD OF RAISING A SUNKEN VESSEL
Fritz Kramer, 60—11 Broadway, Woodside, N.Y. 11377;
Heinz Baumann, Zuckerfabrikstr. 3, Frankenthal, Germany; and Wilhelm Bauer, Kallenbergstrasse 21, Essen, Germany
No Drawing. Filed Jan. 10, 1969, Ser. No. 790,466
Int. Cl. B63c 7/12
U.S. Cl. 114—50         5 Claims

ABSTRACT OF THE DISCLOSURE

A sunken vessel is raised by injecting into the vessel a sufficient amount of urea-formaldehyde resin foam generated under water at the level of the vessel from an aqueous urea-formaldehyde precondensate solution, a solution of a curing agent containing a surfactant, and compressed air. The solutions and the air are pumped to the injection site under a pressure higher than the hydrostatic pressure at the site.

BACKGROUND OF THE INVENTION

This invention relates to the raising of sunken vessels, and particularly to the raising of a vessel by filling the vessel with a sufficient amount of a gas contained in cells having walls of synthetic resin composition.

It has been proposed to raise sunken vessels by pumping a slurry of hollow, air-filled polystyrene beads into the vessel until enough water is displaced to make the vessel and the beads contained therein buoyant. The method is limited in its application to vessels submersed in shallow water. In deep water, the beads are compressed by the hydrostatic pressure so that a very large amount thereof is needed to balance the weight of the sunken vessel. As the hydrostatic pressure decreases during the upward movement of the vessel, the beads expand and ultimately burst the vessel.

The object of the invention is the provision of a method which permits water-filled vessels to be raised from great depths in a simple manner and without damaging the vessel. The term "vessel" as employed in this application will be understood to cover any hollow structure or container, and not merely the hull of a ship.

SUMMARY OF THE INVENTION

With this object and others in view, as will hereinafter become apparent, this invention resides in one of its important aspects in injecting a plastic foam into the sunken vessel and thereby displacing a corresponding amount of water from the same. The foam is generated in the water itself substantially at the level of the submersed vessel and essentially consists of a synthetic resin composition which forms the cell walls in the foam, and of a gas filling the cells under a pressure higher than the hydrostatic pressure of the ambient water.

While the use of an auxiliary crane is not excluded, it is preferred to inject enough foam into the vessel to make the vessel and the foam contained therein buoyant in the water. The preferred foam is prepared from a curable urea-formaldehyde precursor or precondensate dissolved in a liquid medium, a curing agent, and the compressed gas; the liquid medium having the precondensate dissolved therein is pumped to the sunken vessel separately from the curing agent and the gas, and the components are mixed at that level.

It is one of the advantages of urea-formaldehyde resin foam that its cells are predominantly open. As the vessel moves upward in the water, enough of the expanding gas can escape from the cells and from the rising vessel through a suitably provided aperture to prevent internal pressure from building up within the vessel cavity. The foam is normally a unitary mass and cannot escape.

Other features and many of the attendant advantages of this invention will readily become apparent from the following detailed description of an example of the invention.

DESCRIPTION OF THE PREFERRED EMBODIMENT

The storage tanks of an apparatus for producing plastic foam, as described in Bauer Pat. No. 2,860,856, were respectively filled with a 32% aqueous solution of a 1:2 urea-formaldehyde precondensate, the ratio being in moles, and with an aqueous solution of 9% Nacconol SZA, a sodium alkylarylsulfonate and 1% phosphoric acid by weight. The two solutions combined in a mixing chamber at a ratio of 10 parts resin solution and 9 parts acidified surfactant solution were discharged from the nozzle of the apparatus together with compressed air at 65 p.s.i. into the ambient atmosphere, and the feed ratios were adjusted to produce a cured urea-formaldehyde foam having a bulk density of 40 grams per liter. Foam production was then stopped.

The bung hole and a vent in a 55-gallon drum submersed in 165 feet of water were opened. Pieces of pressure hose were arranged between the storage tanks of the afore-described apparatus and the mixing tank and nozzle of a length sufficient to permit the nozzle to be inserted into the submersed drum through the bung hole while the storage tanks were located in a boat floating on the water surface above. The pressure on the liquid in the tanks and the air pressure were set 72 p.s.i. higher than had been determined in the test run in the atmosphere to compensate for the water column of 165 feet, and foam was injected from the nozzle into the drum until the latter started rising. The nozzle was then withdrawn from the bung hole, and the drum rose to the water surface while air bubbled from the bung hole and the vent.

The buoyant drum was recovered and one of its flat end walls was removed. The drum was found to be partly filled with a unitary body of urea-formaldehyde foam which could be withdrawn cleanly after it had been split into three pieces. It had a compressive strength of only 0.2 p.s.i., and it was apparent that air had escaped from the barrel during the upward movement of the latter because the gas in the cells expanded as the hydrostatic pressure decreased, thereby escaping from the open cells and bursting the relatively few closed cells. Enough air, however, was retained in the cellular material and in the drum to buoy the latter. The dry weight of the recovered foam was the same as that of the foam produced in the trial run under atmospheric pressure.

A boat or ship can be raised in the same manner as described hereinabove with reference to a drum, and a drum or similar vessel may be attached to a sunken piece of machinery or the like for raising the same to the surface. The depth of immersion from which a vessel may be recovered is limited only by the need of inserting a nozzle into an opening of the vessel. A diver or a diving boat equipped with remotely operated manipulators must approach the vessel and insert the nozzle attached to the mixing chamber through a suitable opening in the vessel.

Because of the high rate at which urea-formaldehyde resin foam cures, it is not practical to generate the foam at the water surface and to inject the foam through a long nozzle into a vessel submersed to any depth at which the method of the invention has advantages over more conventional methods, such as the use of a floating dock or of a hoist.

If a sunken hull is in an undesirable position, it can be turned over by filling only one suitable compartment with foam or by filling one compartment with more foam than other compartments, as will be obvious. If the salvage operation is based on a diving bell or a submersed pressurized chamber, the storage tanks for the solutions employed in generatnig the foam may be located in such a bell or chamber, and the necessary pressure adjustments will readily be calculated. The pressure at which the foam is ejected from the nozzle should be approximately 65 p.s.i. higher than that of the space into which the foam is ejected if it is desired to produce foam having a bulk density of about 40 g./liter when wet and at ambient pressure.

Urea-formaldehyde foam does not adhere to the usual materials employed in ship construction. The foam is therefore removed without difficulty after the vessel has been raised. The removed foam material is still useful as an insulating filler or for other purposes for which urea-formaldehyde foams have been found applicable.

Urea-formaldehyde resin is the most inexpensive synthetic polymer for producing foams for the process of the invention at this time. It will be appreciated, however, that other synthetic resin compositions may be used for generating a foam, preferably an open-celled foam, at the level at which the vessel to be recovered is located under water.

It will be understood, therefore, that this invention does not reside in the composition of the foam employed nor in the specific ingredients, conventional in themselves, which have been described above in an illustrative example. Obviously, the ratio of resin precursor, surfactant and curing agent may be modified to vary the properties of the foam produced in a manner known in itself. Other surfactants operative in the presence of the selected curing agent may be substituted for the sodium alkylarylsulfonate specifically mentioned, and phosphoric acid is merely an example of a known and commercially used curing agent for urea-formaldehyde resin in foam form. Air, of course, is the most readily available gas for use in making the resin foam, but any gas substantially inert to the resin precursor, the resin, and the curing agent may be employed instead, this invention being concerned with mechanical aspects of the foam generating process only, but not with the chemical aspects.

What is claimed is:
1. A method of raising a vessel submersed in a body of water and filled with water which comprises:
  (a) generating an essentially open-celled foam in said body of water substantially at the level of said submersed vessel from a synthetic resin composition forming the walls of the cells of said foam and a gas under a pressure higher than the hydrostatic pressure at said level; and
  (b) injecting said foam into said vessel and thereby displacing from the vessel an amount of water sufficient to make the vessel buoyant.

2. A method as set forth in claim 1, wherein said foam is generated by mixing a precursor of said resin composition dissolved in a liquid medium, said gas and a curing agent for said precursor at said level.

3. A method as set forth in claim 2, wherein said resin composition is a urea-formaldehyde resin, and said precursor is a precondensate of urea and formaldehyde.

4. A method as set forth in claim 2, wherein said liquid medium having said precursor dissolved therein and said gas are pumped from the surface of said body of water to said level under a pressure greater than said hydrostatic pressure for generating said foam.

5. A method as set forth in claim 1, wherein a majority of said cells is open, and said vessel is provided with an aperture for escape of said gas therefrom during the raising of said vessel.

References Cited

UNITED STATES PATENTS

| | | | |
|---|---|---|---|
| 3,057,694 | 10/1962 | Kessler | 114—50X |
| 3,091,205 | 5/1963 | Watson | 114—50 |
| 3,269,342 | 8/1966 | Sobek | 114—50 |
| 3,284,379 | 11/1966 | Brasco et al. | 260—2.5 |
| 3,303,808 | 2/1967 | Helbig | 114—52 |

ANDREW H. FARRELL, Primary Examiner